(12) United States Patent
Kim et al.

(10) Patent No.: US 10,782,802 B2
(45) Date of Patent: *Sep. 22, 2020

(54) TOUCH SENSING OF USER INPUT DEVICE

(71) Applicant: Microsoft Technology Licensing, LLC, Redmond, WA (US)

(72) Inventors: Young Kim, Bellevue, WA (US); James Alec Ishihara, Bellevue, WA (US); Scott Schenone, Seattle, WA (US); Ralf Groene, Kirkland, WA (US); Filipp Demenschonok, Seattle, WA (US); Michael Baum, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,763

(22) Filed: Jul. 12, 2019

(65) Prior Publication Data

US 2019/0332197 A1    Oct. 31, 2019

Related U.S. Application Data

(63) Continuation of application No. 14/928,958, filed on Oct. 30, 2015, now Pat. No. 10,386,940.

(51) Int. Cl.
| | | |
|---|---|---|
| *G06F 3/0354* | (2013.01) | |
| *G06F 3/0362* | (2013.01) | |
| *G06F 3/01* | (2006.01) | |
| *G06F 3/044* | (2006.01) | |
| *G06F 3/0482* | (2013.01) | |
| *G06F 3/0484* | (2013.01) | |
| *G06F 3/0488* | (2013.01) | |

(52) U.S. Cl.
CPC .......... *G06F 3/03545* (2013.01); *G06F 3/016* (2013.01); *G06F 3/0362* (2013.01); *G06F 3/044* (2013.01); *G06F 3/0482* (2013.01); *G06F 3/0488* (2013.01); *G06F 3/04847* (2013.01)

(58) Field of Classification Search
CPC .... G06F 3/03545; G06F 3/0362; G06F 3/044; G06F 3/0482; G06F 3/04847; G06F 3/0488; G06F 3/016
See application file for complete search history.

(56) References Cited

U.S. PATENT DOCUMENTS

| | | | | |
|---|---|---|---|---|
| 9,665,206 B1 * | 5/2017 | Missig | .................. | G06F 3/0416 |
| 2007/0115265 A1 * | 5/2007 | Rainisto | ................ | G06F 3/0412 |
| | | | | 345/173 |

* cited by examiner

*Primary Examiner* — Patrick N Edouard
*Assistant Examiner* — Joseph P Fox
(74) *Attorney, Agent, or Firm* — Alleman Hall Creasman & Tuttle LLP (57) ABSTRACT

Examples are disclosed herein that relate to user input. One example provides a method comprising receiving user inputs from a user input device, monitoring a touch-sensitive display device for detection of a presence of the user input device via the touch-sensitive display device, when the user input device is detected by the touch-sensitive display device, utilizing a first user input mode in which a first user interface is displayed on the touch-sensitive display device at a location based upon a location of the input device on the touch-sensitive display device, and when the user input device is not detected by the touch-sensitive display device, utilizing a second user input mode in which a second user interface is displayed at a location on the touch-sensitive display device not based upon a location of the input device.

20 Claims, 8 Drawing Sheets

TOUCH SENSING OF USER INPUT DEVICE

CROSS REFERENCE TO RELATED APPLICATIONS

This application is a continuation of U.S. patent application Ser. No. 14/928,958, filed Oct. 30, 2015, the entire contents of which is hereby incorporated herein by reference for all purposes.

BACKGROUND

Computing devices that utilize touch-sensitive displays may be configured to receive user input in a variety of forms. For example, a touch-sensitive display may sense touch inputs made via a finger or a stylus.

SUMMARY

Examples are disclosed herein that relate to a user input device for use with a touch-sensitive display device, and also to interactions between the touch-sensitive display device and the user input device. One example provides a method comprising receiving user inputs from a user input device and monitoring a touch-sensitive display for detection of a presence of the user input device via the touch-sensitive display. When the user input device is detected via the touch-sensitive display, the method includes utilizing a first user input mode in which a first user interface is displayed on the touch-sensitive display at a location based upon a location of the input device on the touch-sensitive display. When the user input device is not detected by the touch-sensitive display, the method includes utilizing a second user input mode in which a second user interface is displayed at a location on the touch-sensitive display not based upon a location of the input device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
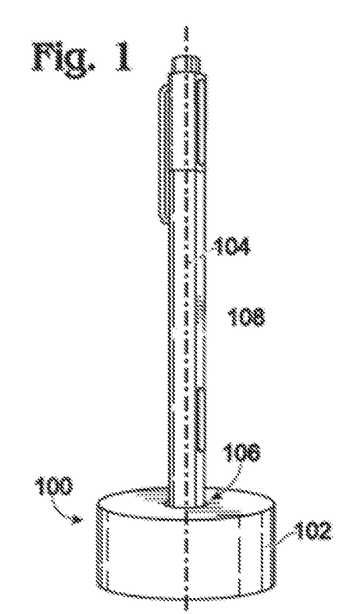
FIG. 1 shows an example user input device.

FIG. 1 shows an example user input device 100 comprising a control 102 configured for rotation about an axis 104 and for depression along the axis. The user input device 100 may sense such rotations and depressions, and transmit information regarding the rotation and/or depression to a computing device (not shown in FIG. 1). The computing device may interpret the transmitted information as user inputs for controlling computing device functions. As described in more detail below, user input device 100 may include features detectable by a touch sensor of the computing device, thereby allowing the computing device to select an operating mode based upon a presence or absence of user input device 100 on a touch sensitive display or other touch sensor.

As shown in FIG. 1, user input device 100 may comprise a recess 106 configured to receive a stylus 108. When docked in recess 106, stylus 108 may be held in a fixed position without wobbling or rotating as user input device 100 is moved and rotated. In some examples user input device 100 may be configured to sense the presence of stylus 108 in recess 106, and may send information regarding the sensed presence of the stylus to a computing device. The computing device may use this information as input to select user input modes, for example. Further, in some examples, user input device 100 may be configured to charge the stylus via a charger located within or adjacent to recess 106.

Figure 2:
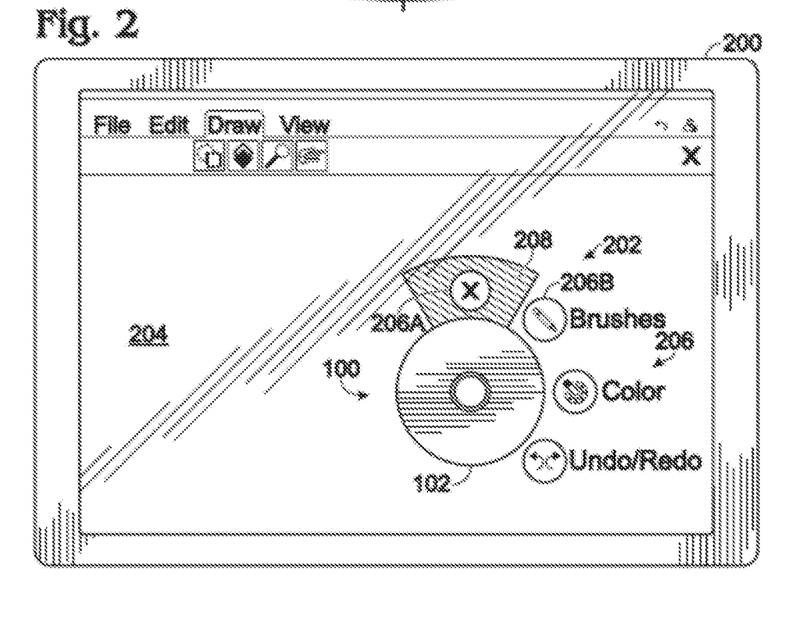
FIG. 2 illustrates an example first user input mode utilized when the user input device of FIG. 1 is detected on a touch-sensitive display.

As mentioned above, a computing device may select a user input mode depending on whether the presence of user input device 100 is detected via a touch sensor of the computing device (such that user input device 100 is located on or hovering over the touch sensor). FIG. 2 illustrates a first user input mode utilized when user input device 100 is detected by a computing device 200 comprising a touch-sensitive display 204. Computing device 200 also may be referred to as a touch-sensitive display device. While computing device 200 is shown as a mobile computing device, a computing device for use with user input device 100 may take any other suitable form, such as a large format horizontal display device, a desktop computing device with an adjustable display angle, etc.

In the first user input mode, a first user interface 202 is displayed on touch-sensitive display 204 at a location based upon a location of user input device 100 on touch-sensitive display 204. In the example of FIG. 2, user interface elements 206 are arranged around the perimeter of user input device 100. Such a user interface may be referred to a "palette" mode, as user interface elements 206 are distributed in palette-like fashion. However, the user interface elements may have any other suitable arrangement relative to the location of the user input device 100 on touch-sensitive display 204. The computing device 200 further may track movements of user input device 100 on touch-sensitive display 204 and move the elements of first user interface 202 in response to the tracked motion of the input device. Tracking of user input device 100 is described in more detail below.

User input device 100 may be used to select user interface elements 206 for interaction. FIG. 2 shows a user interface element 206A that is selected for possible interaction, wherein the selected state of the user interface element 206A is indicated by highlighting 208. Any other suitable mechanism may be used to convey selection of a user interface element.

To change the user interface element selection, a user may rotate the rotational control of user input device 100. The rotational data is detected by a suitable sensor, and rotational data is provided to the computing device 200 as a user input. In response to the input, the highlighting indicating selection moves to element 206B from element 206A, indicating that selection has moved to element 206B. The user may interact with a selected user interface element by depressing control 102. A depression of control 102 may be reported and/or interpreted as a click event, for example.

Activation of a selected user interface element 206 may cause computing device 200 to carry out functionality associated with the user interface element. For example, activation of user interface element 206A may cause display of one or more brushes in first user interface element 202 as part of a drawing application running on the display device. The one or more brushes may be distributed circumferentially about the position of user input device 100 on display 204, and may each be capable of selection and activation to cause display of a respective brush pattern in response to suitable user input (e.g., touch input, stylus input). The number, type, distribution, and functionality of user interface elements 206 may vary depending upon a context of the interaction.

User input device 100 may be used to control computing device 200 while not positioned on touch-sensitive display 204. In such instances, a second user input mode may be utilized in which the user interface is not positioned based upon the presence and location of user input device 100 on touch-sensitive display 204. The transition between the first and second user input modes may occur automatically upon detecting removal of user input device 100 from touch-sensitive display 204, or upon user input requesting the transition.

Figure 3:
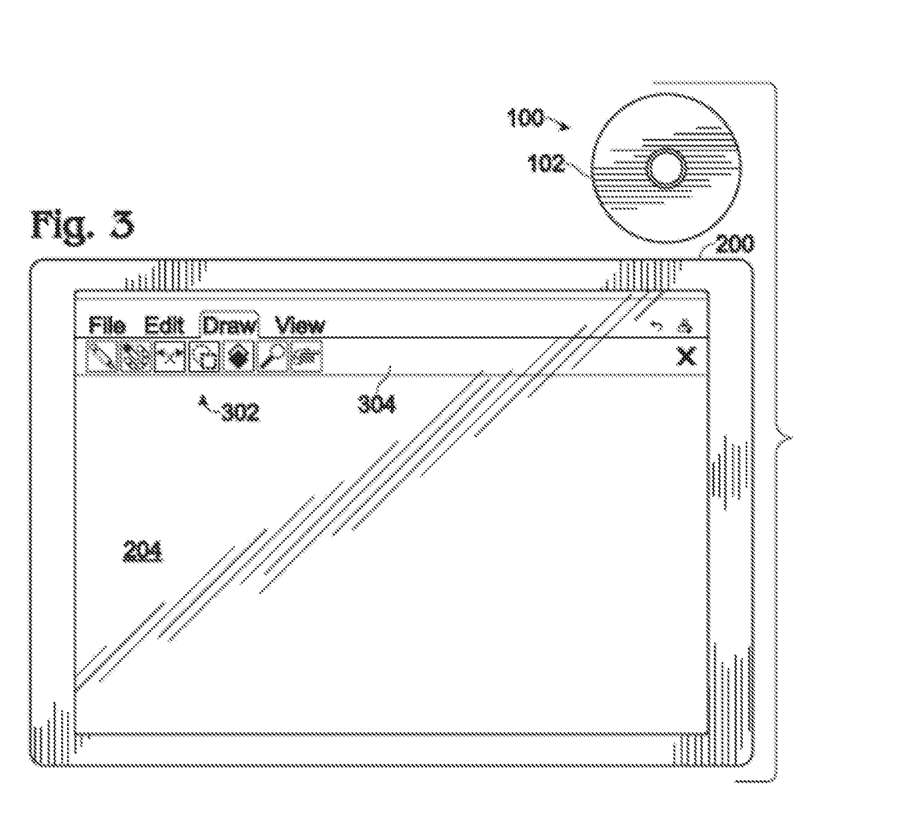
FIG. 3 illustrates an example second user input mode utilized if the user input device of FIG. 1 is not detected on the touch-sensitive display of FIG. 2.

FIG. 3 shows an example second user interface 302. In this example, user interface elements 206 (FIG. 2), which were positioned based on the location of user input device 100 in the first user input mode, are moved to respective predetermined positions in a toolbar 304 of second user interface 302. Toolbar 304 further may include user interface elements that are located in the toolbar in the first user input mode.

In the second user input mode, rotation and/or depression of user input device 100 may be mapped to different functions than in the first user input mode. For example, rotation and/or depression of the user input device 100 may be mapped to volume control, media control functions, operating system control functions, etc. In other examples, rotation and/or depression of user input device 100 may continue to be mapped to functions of second user interface 302.

Computing device 200 also may transition to different user input modes in response to detecting the docking of stylus 108 in recess 106 (referring again to FIG. 1). For example, a user interface element may be removed from or added to display 204, a function associated with a displayed user interface element may be modified, etc. Stylus 108 also may serve as an input device when docked in recess 106. For example, the stylus may be rotated to provide rotational input and/or the stylus may be depressed.

Computing device 200 may utilize any suitable touch sensing mechanism, including but not limited to capacitive, resistive, and optical touch sensing mechanisms. User input device 100 may include features to facilitate detection and tracking by a touch sensing mechanism. For example, as described in further detail with reference to FIG. 8, user input device 100 may include a capacitive pattern detectable by a capacitive touch sensor.

Figure 4:
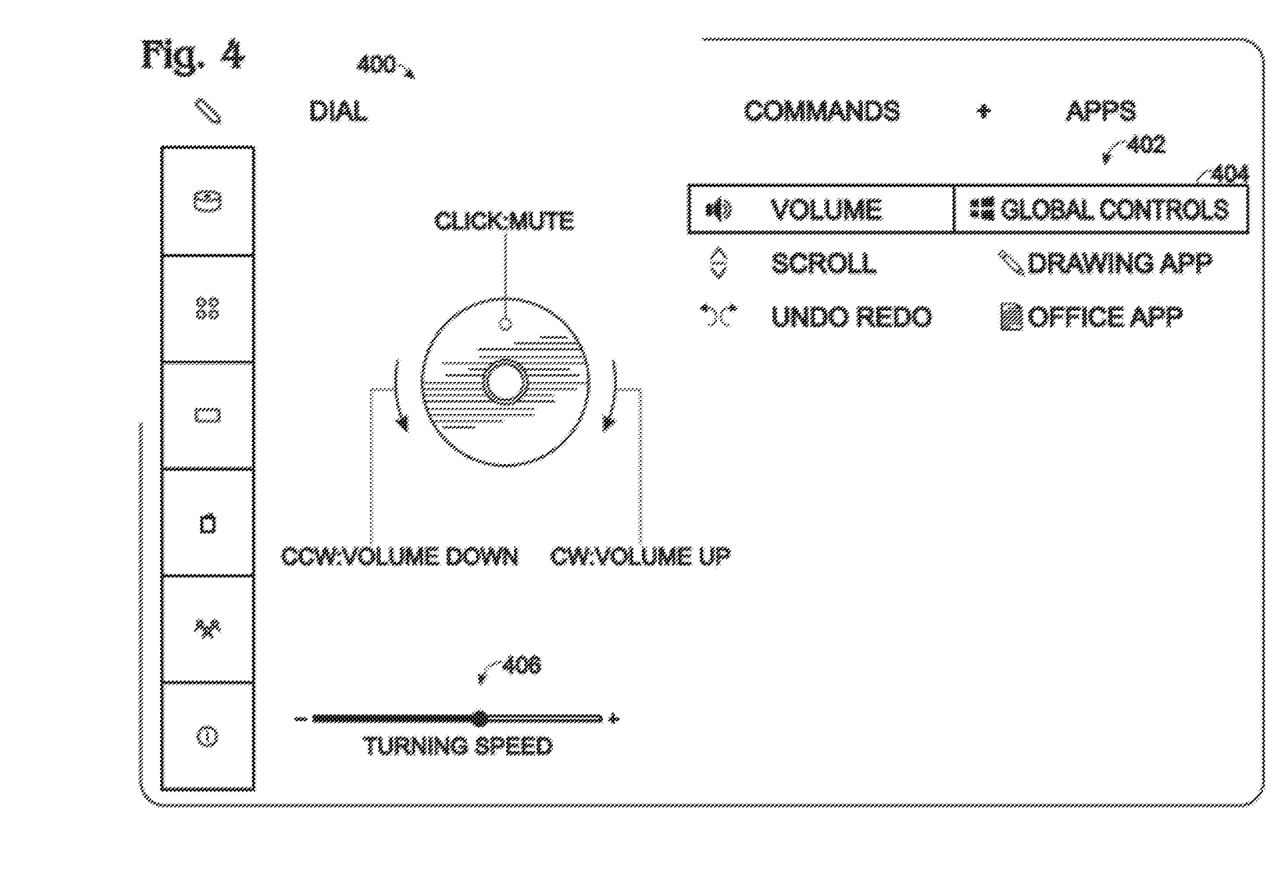
FIG. 4 shows another example user interface controllable via the input device of FIG. 1.

FIG. 4 shows another example user interface 400 controllable via user input device 100. In this example, the user interface 400 includes various system functions controllable via input device 100. For example, the user interface 400 includes a "volume down" function mapped to counterclockwise rotation of input device 100, a "volume up" function mapped to clockwise rotation of the input device, and a "mute" function mapped to clicking (e.g., depression) of the input device.

User input device 100 may be used to interact with a variety of other function categories. A user may select to interact with a function category, for example, by touch or stylus input to bring the category of interest into selection for interaction with user input device 100. FIG. 4 shows a "scroll" function category in which upward scrolling may be mapped to counterclockwise rotation of user input device 100, downward scrolling may be mapped to clockwise rotation of the input device, and a transition function causing transition between vertical and horizontal scrolling may be mapped to depression of the input device, for example. FIG. 4 also shows an "undo/redo" function category in which an undo function may be mapped to counterclockwise rotation of user input device 100, a redo function may be mapped to clockwise rotation of the input device, and a copy/paste function may be mapped to depression of the input device. Respective functions mapped to counterclockwise and clockwise rotation, however, may be reversed, for example via a user interface element (not shown) for accommodating variation in user handedness.

User interface 400 may further include application selectors 402 that facilitate the mapping of functions to individual applications. As such, application selectors 402 include individual selectors for respective applications. Application selectors 402 may further include a global selector 404 for mapping functions that are actionable regardless of application context.

A speed selector 406 may be provided for controlling how rotational input supplied via user input device 100 is applied to a displayed user interface. Specifically, speed selector 406 may control the factor by which the magnitudes of angular displacements in physical space are scaled for translation to display space. Speed selector 406 is shown in the form of a sliding mechanism, but may take any form. A user may interact with the sliding mechanism via touch/stylus, via user input device 100, or in any other suitable manner.

Figure 5:
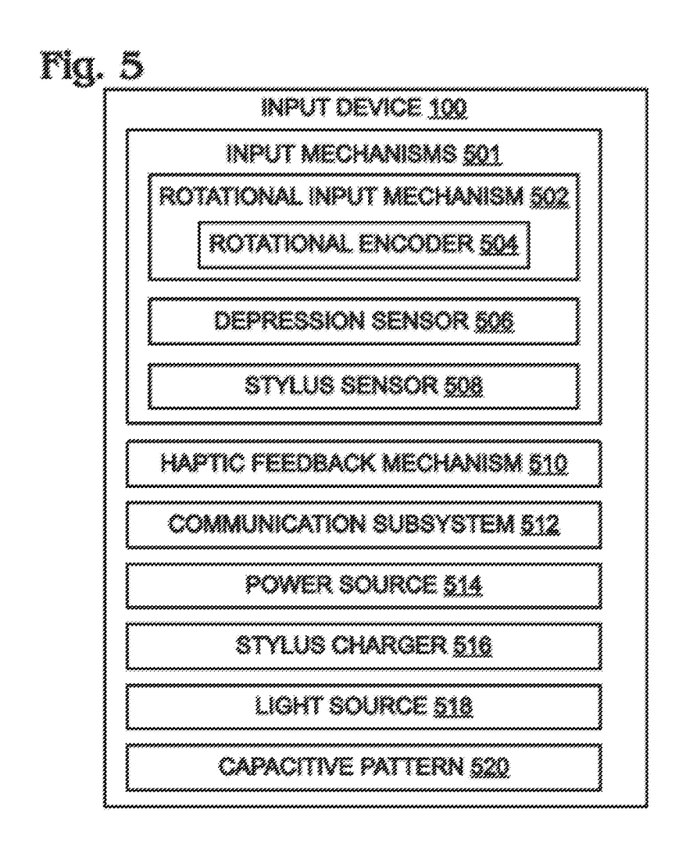
FIG. 5 shows a block diagram of the user input device of FIG. 1.

FIG. 5 shows a block diagram of user input device 100. User input device 100 may include one or more input mechanisms 501, such as a rotational input mechanism 502, which may be control 102 of FIG. 1, for example. Rotational input mechanism 502 may be rotatable and depressible, as described above.

Rotational input mechanism 502 may include a rotational encoder 504 to sense rotation of user input device 100. Any suitable rotational encoder may be used, including but not limited to an optical encoder. An optical encoder may utilize a light source and an image sensor. The light source may illuminate markings formed, for example, on an inner surface of a rotatable cover (e.g., of control 102 of FIG. 1) of the input device, that can be identified in images captured by the image sensor. The imaged markings may be evaluated to determine one or more measurable properties of rotation, including a magnitude (distance) and a direction of rotation. Further, in some examples, rotational velocity and/or acceleration also may be measured. In some examples, the markings may enable a determination of an absolute angular orientation of rotational input mechanism 502, while in other examples the markings may be used to track rotational change but not orientation. In other implementations, other rotational encoders than optical encoders may be used, including but not limited to mechanical, resistive, and magnetic encoders.

As mentioned above, in some examples depression sensor 506 may be coupled to the rotational input mechanism, such that a user can press on a rotatable cover of the user input device 100 to perform a button press. In other examples, depression sensor 506 may employ a separate pressable input mechanism from the rotational input mechanism, such as a push switch.

Input mechanisms 501 further may include a stylus sensor 508 for detecting the presence of a stylus. Stylus sensor 508 may employ any suitable mechanism for detecting stylus docking. In some implementations, user input device 100 may be configured to support rotation and/or depression of a docked stylus, in which case the stylus sensor 508 may sense such rotation and/or depression for use as inputs to a computing device. In yet other implementations, stylus sensor 508 may sense touch and/or hover input applied to a docked stylus.

User input device 100 further may include a haptic feedback mechanism 510 for providing haptic feedback to users. Haptic feedback mechanism 510 may include any suitable device for providing haptic feedback, including but not limited to a linear resonant actuator, a piezoelectric device, and an eccentric rotating mass. In some examples, haptic feedback mechanism 510 may be coupled to rotational input mechanism 502 so that haptic feedback is provided to the portion of user input device 100 directly touched by a user, which may help to reduce the propagation of haptic feedback forces to surfaces typically not touched by the user.

In some implementations, the conditions for which haptic feedback is generated by haptic feedback mechanism 510 may be adjustable. For example, a computing device (e.g., computing device 200 of FIG. 2) in communication with user input device 100 may send a haptic feedback setting instruction to cause the input device to output haptic feedback in response to a rotational input meeting a specified range of rotation. When user input device 100 receives a rotational input that meets the specified range, the input device activates haptic feedback mechanism 510 in response.

Figure 6:
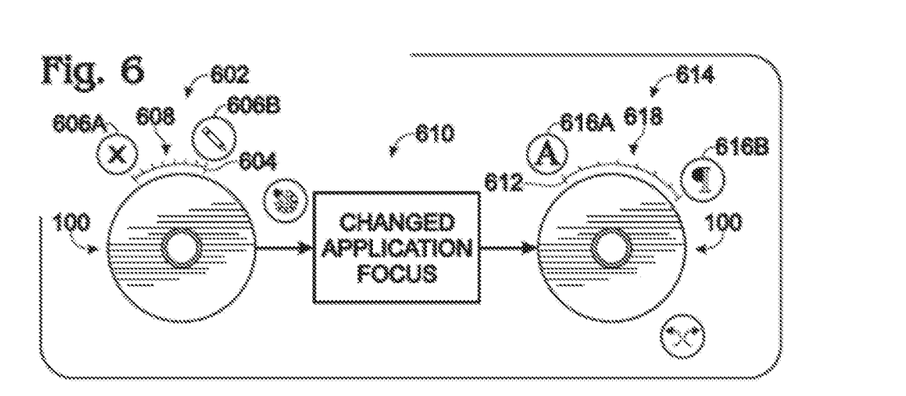
FIG. 6 illustrates an example modification of haptic feedback settings of the user input device of FIG. 1.

The rotational range configured to trigger haptic feedback may be selected/adjusted in any suitable manner. For example, the spacing between user interface elements may change with changes in user interface context. As such, the rotational range may be adjusted in response to such contextual changes. FIG. 6 illustrates a first haptic feedback setting 602 mapping a first range 604 of rotation of user input device 100 to a haptic feedback output event. First range 604 spans an arc extending between user interface elements 606A and 606B. When the rotational input mechanism is rotated through first range 604, user input device 100 may output haptic feedback in response. This may help to inform users when the selection has moved from user interface element 606A to user interface element 606B.

Haptic feedback also may be provided within the first range 604. FIG. 6 shows first range 604 divided equally into first intervals 608, wherein haptic feedback may be provided in response to rotation through each of the first intervals. Further, settings that divide first range 604 into unequal intervals may be used.

FIG. 6 also illustrates updating of a haptic feedback setting. As shown at 610, a change of application context, such as from a drawing application to a word processing application, may prompt the updating of a first haptic feedback setting to a second haptic feedback setting that maps a second range 612 of rotational input of the rotational input mechanism to the haptic feedback output. As shown at 614, second range 612 differs from first range 604, in that the second range spans a relatively larger arc extending between user interface elements 616A and 616B, which are spaced farther apart relative to the spacing between user interface elements 606A and 606B. FIG. 6 also shows second range 612 divided into second intervals 618, at each of which haptic feedback may be provided.

In some implementations, different haptic outputs may be provided for different haptic settings. For example, haptic feedback outputs may differ in one or more of duration, intensity, frequency, pattern, etc. Haptic feedback also may be provided when user input device 100 is not positioned on a touch sensitive display, such as in the user mode depicted in FIG. 3.

Returning to FIG. 5, user input device 100 may include a communication subsystem 512 for receiving and/or transmitting data. For example, communication subsystem 512 may transmit to a computing device (e.g., computing device 200 of FIG. 2) information regarding one or more of a rotational displacement of rotational input mechanism 502 (e.g., control 102 of FIG. 1) reported by rotational encoder 504, depression of user input device 100 reported by depression sensor 506, a communication pairing signal for pairing the input device with the computing device, an indication of the state of a power source 514 (e.g., a battery life indication or low battery indication), and an indication of docking of a stylus in the input device reported by stylus sensor 508. Alternatively or additionally, communication subsystem 512 may receive data from the computing device. For example, the computing device may transmit haptic feedback settings via communication subsystem 512 to user input device 100 for controlling the output of haptic feedback mechanism 510.

Communication subsystem 512 may take any suitable form. In some implementations, communication subsystem 512 may comprise a radio transceiver, which may be configured for BLUETOOTH communication, for example. Other configurations are possible, however, including communication subsystems that employ other wireless communication protocols, as well as wired and/or optical connections. Further, communication subsystem 512 may be operable in a discoverable mode in which pairing signals are emitted for a selected duration in an attempt to discover a suitable computing device with which to pair.

User input device 100 further includes a power source 514. Power source 514 may provide power to various components of user input device 100—for example, one or more of rotational encoder 504, depression sensor 506, stylus sensor 508, haptic feedback mechanism 510, communication subsystem 512, a stylus charger 516, and a light source 518. Power source 514 may assume any suitable form, such as that a removable or non-removable battery.

User input device 100 may be configured to operate in multiple power states—e.g., a full power state, reduced power state, sleep state, and an off state—to efficiently use battery life. For example, power source 514 may operate in the sleep state in response to expiration of a threshold duration of inactivity—e.g., in response to timeout of the discoverable mode of communication subsystem 512, expiration of a threshold duration of an absence of touch and/or hover input applied to user input device 100. As part of entering the sleep state, power source 514 may reduce and/or cease power supply to one or more elements of user input device 100.

As mentioned above, in some examples user input device 100 may include a stylus charger 516. Stylus charger 516 may be operable to charge a power supply (e.g. a rechargeable battery) on the stylus. Stylus charger 516 may be configured to provide power to a stylus upon receiving an indication from stylus sensor 508 that a stylus has docked in user input device 100.

User input device 100 may include a light source 518, for example, for use as a status indication light. Light source 518 may include a light-emitting diode (LED), or any other suitable type of light source. Light source 518 may be used to provide any suitable information, such as feedback during a pairing process to indicate that pairing is progressing and/or has been successfully completed. Light source 518 may alternatively or additionally convey information regarding the state of power source 514—for example, the light source may flash on/off for a selected duration to indicate a low power state of the power source. Further, multiple light sources configured to provide light of different colors may be used as an additional mode of visual feedback. As a more specific example, one color may be used to provide an indication of a normal battery level, and a different color may be used to indicate a low battery state.

User input device 100 further may include a capacitive base pattern 520 for enabling detection of the input device by a capacitive touch sensor. Capacitive pattern 520 may be configured such that, when placed in contact with, and/or proximate to, the capacitive sensor, a recognizable pattern is produced in the output of the capacitive sensor. Capacitive pattern 520 may facilitate detection of one or more of the presence, location, identity (e.g., for environments in which multiple input devices 100 are used), and (e.g., angular) orientation of the input device. An example structure for capacitive base pattern 520 is described below with regard to FIG. 8.

Capacitive pattern 520 further may be configured to allow the detection of a touch made to user input device 100. For example, capacitive pattern 520 may be electrically coupled to a surface of user input device 100 typically touched by a user during operation, such as a surface of rotational input mechanism 502. Upon receiving touch input at user input device 100, the recognized pattern produced in the output of a capacitive sensor may change in a recognizable manner—e.g., the pattern detected via the capacitive touch sensor may invert in response to touch input. This may be used to trigger various events, such as the display of a user interface controllable by the user input device 100. In some examples, the capacitive pattern also may be configured to be detectable by a computing device when held over but not in contact with a touch-sensitive display, such that hover inputs may be implemented.

Various implementations may include components not shown in FIG. 5, and/or a subset of component shown in FIG. 5. For example, one or more of the data types described above that may be transmitted via communication subsystem 512 may instead be transmitted via capacitive pattern 520. In this example, power source 514 may provide a time-varying voltage to capacitive pattern 520, where the time-varying voltage may be modulated to encode various data, including but not limited to output from rotational encoder 504, depression sensor 506, stylus sensor 508, and/or a state of the power source. Similarly, a time-varying voltage encoding data may be coupled into capacitive pattern 520—e.g., by electrode matrix 210 of computing device 200—for example in order to supply haptic feedback settings to user input device 100.

Figure 7A:
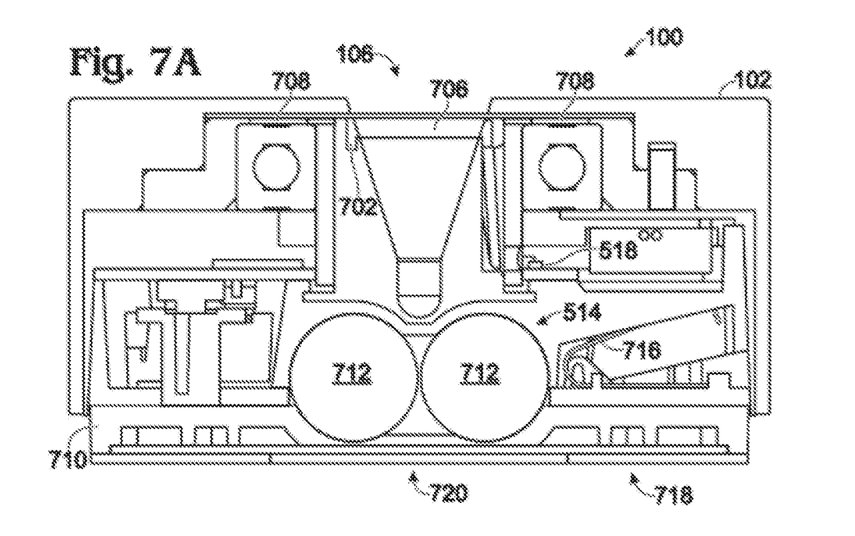
FIGS. 7A-7B show a cross section of the user input device of FIG. 1 in various different states.
Figure 7B:
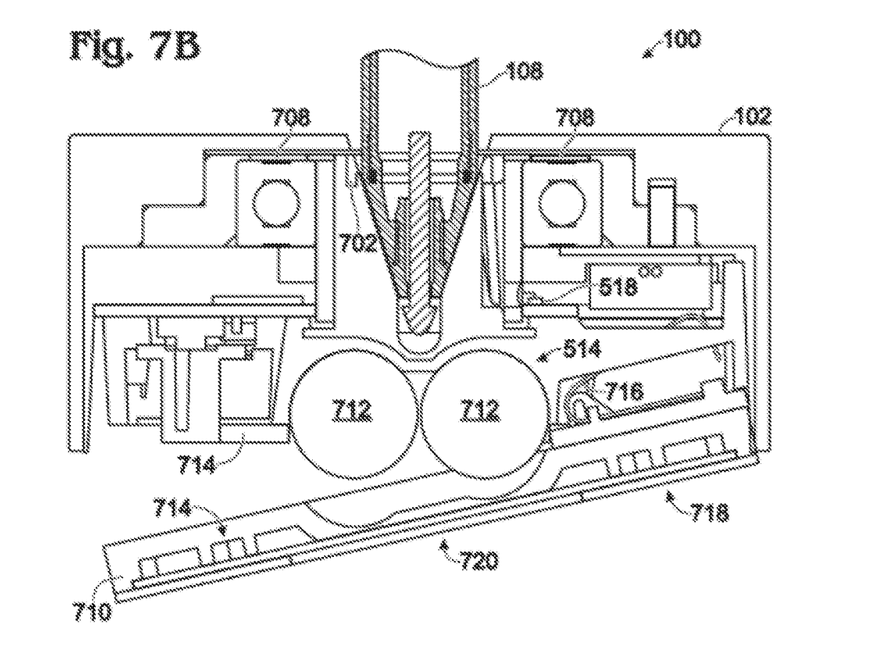

FIGS. 7A-7B show a cross section of user input device 100 in various different states. First referring to FIG. 7A, user input device 100 includes a light guide 702 for transmitting light emitted by light source 518 to a location where light emission is perceptible to proximate users. Light guide 702 may include an upper annular region 706 that appears as a circle when viewed from the top (e.g., from the perspective depicted in FIGS. 2 and 3), or may take any other suitable form.

Light guide 702, along with other components of user input device 100 such as recess 106, may be physically decoupled from control 102 so that rotation of the control does not result in rotation of the light guide and the other decoupled components. To facilitate decoupling of components from control 102, user input device 100 may include a rotatable bearing mechanism 708.

FIG. 7A shows user input device 100 in a state in which a stylus is not docked in recess 106, and a door 710 providing access to power source 514 is closed. Conversely, FIG. 7B shows user input device 100 in a different state in which stylus 108 is docked in recess 106, and door 710 is open.

As described above, recess 106 may be configured to hold stylus 108 so that the stylus does not move or wobble when user input device 100 is rotated or translated. Various retention mechanisms may be provided for this function, including but not limited to frictional and/or elastomeric materials located on the surface of recess 106, spring mechanisms, and detent mechanisms.

Door 710, introduced above, may provide access to power source 514, which is shown in the form of two batteries 712 but may take any other suitable form. In the depicted example, door 710 is held closed via magnets 714, and may be biased toward the closed position via a spring-biased hinge 716. In this configuration, a user may open door 710 by pushing on a side 718 of a base 720, overcoming the magnetic force provided by magnets 714 and compressing spring-biased hinge 716. The magnetic retention mechanism provided by magnets 714 may allow base 720 to be fully removed, for example to allow access to power source 514. In other examples, door 710 may utilize other mechanisms. For example, door 710 may be attached and removed via a snap mechanism.

Figure 8:
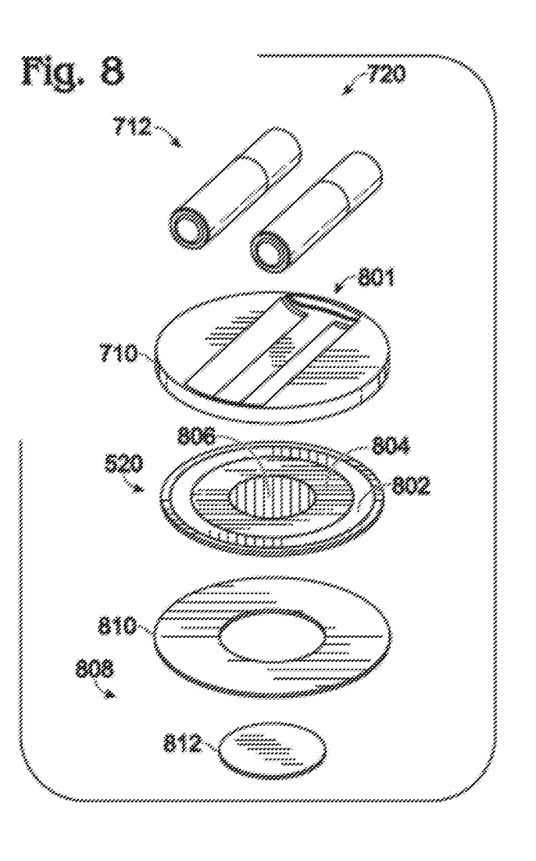
FIG. 8 shows an exploded view of an example base portion of the user input device of FIG. 1.

FIG. 8 shows an exploded view of base 720 of FIG. 7. Base 720 may comprise door 710, which includes a cavity 801 having a shape complementary to the geometry of batteries 712 for securely holding the batteries therein. Base 720 may further comprise capacitive pattern 520. As described above, capacitive pattern 520 may be configured to be detectable by a capacitive touch sensor to allow the touch sensor to locate the user input device 100. Capacitive pattern 520 may be symmetrical, or may be at least partially asymmetric to allow an orientation of user input device 100 on the touch sensor to be resolved.

FIG. 8 depicts an example capacitive pattern 520 comprising a bullseye pattern in which an outer ring 802 of conductive material surrounds an inner ring 804 of dielectric material, which in turn surrounds a central portion 806 comprising the conductive material. Other capacitive patterns may have any other suitable configuration.

Further, as mentioned above, capacitive pattern 520 may be configured to be responsive to a user touching and/or hovering proximate input device 100 in a manner detectable by a capacitive touch-sensitive display (e.g., display device 200 of FIG. 2). As such, the capacitive pattern 520 may be coupled to the rotational input mechanism so that the capacitance of the capacitive pattern varies in response to user touch of the rotational input mechanism.

Base 720 also may comprise materials configured to interact in different manners with a touch surface on which user input device 100 is placed. In the depicted implementation, base 720 comprises a bottom surface 808 including a first portion 810 and a second portion 812. A first material that is configured for sliding movement across a display device (e.g., across display 204 of FIG. 2) may be disposed on first portion 810. Conversely, a second material that is configured to oppose the sliding movement across the display device may be disposed on second portion 812. With such a base configuration, user input device 100 may be smoothly slid across the display device yet held securely in a fixed location when not moved, which may prevent undesired sliding when positioned at an incline. To balance these functions, one or more of the area, geometry, surface relief, and coefficient of friction of the first and second materials may be carefully selected. As non-limiting examples, the first material may comprise a microfiber felt, while the second material may comprise suction tape or foam. In other examples, any other suitable materials may be used. While first and second portions 810 and 812 are shown in a generally concentric configuration, any other suitable arrangement is possible. Furthermore, more than two different materials may be used on base 808 in some examples, depending upon properties desired for the base.

Figure 9:
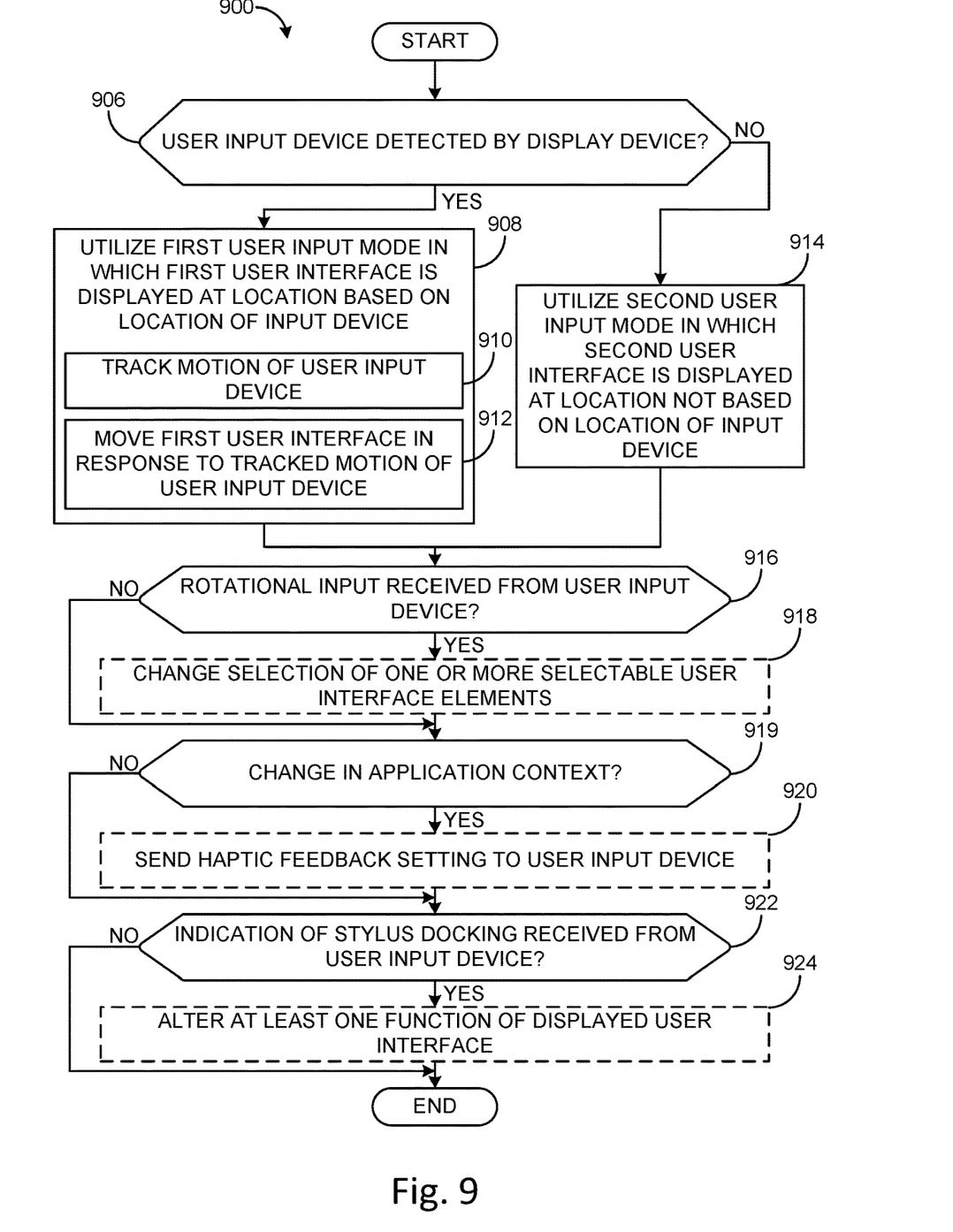
FIG. 9 shows a flowchart illustrating an example method of operating a computing device comprising a touch-sensitive display.

FIG. 9 shows a flowchart illustrating an example method 900 of operating a computing device comprising a touch-sensitive display. Method 900 may be used to operate computing device 200 of FIG. 2, for example.

At 906, method 900 includes determining whether a user input device is detected by the touch-sensitive display device. The user input device may be user input device 100 of FIG. 1, for example. If it is determined that the user input device is detected (YES), a first user input mode is utilized at 908 in which a first user interface is displayed on the touch-sensitive display device at a location based upon a location of the user input device on the touch-sensitive display device. Utilization of the first user input mode may include, at 910, tracking motion of the user input device, and, at 912, moving the first user interface in response to the tracked motion of the user input device.

If, on the other hand, it is determined at 906 that the user input device is not detected (NO), a second user input mode is utilized at 914 in which a second user interface is displayed on the touch-sensitive display device at a location not based upon a location of the user input device on the touch-sensitive display device.

At 916, method 900 includes determining whether rotational input is received from the user input device. If it is determined that rotational input was received from the user input device (YES), a selection of one or more selectable user interface elements optionally may be changed at 918 in response to receiving the rotational input. If it is determined that rotational input was not received from the user input device (NO), method 900 proceeds to 919.

At 919, method 900 includes determining whether there is a change in application context. If it is determined that there was a change in application context (YES), a haptic feedback setting optionally may be sent to the user input device at 920. The haptic feedback setting may instruct the user input device to output haptic feedback in response to a rotational input supplied via the user input device meeting a range of rotational input specified by the haptic feedback setting, for example. If it is determined that there was not a change in application context (NO), method 900 proceeds to 922.

At 922, method 900 includes determining whether an indication of docking of a stylus is received from the user input device. If it is determined that the indication of stylus docking was received (YES), one or more functions of a displayed user interface may be altered at 924 in response to receiving the indication of stylus docking. If it is determined that the indication of stylus docking was not received (NO), method 900 ends.

Figure 10:
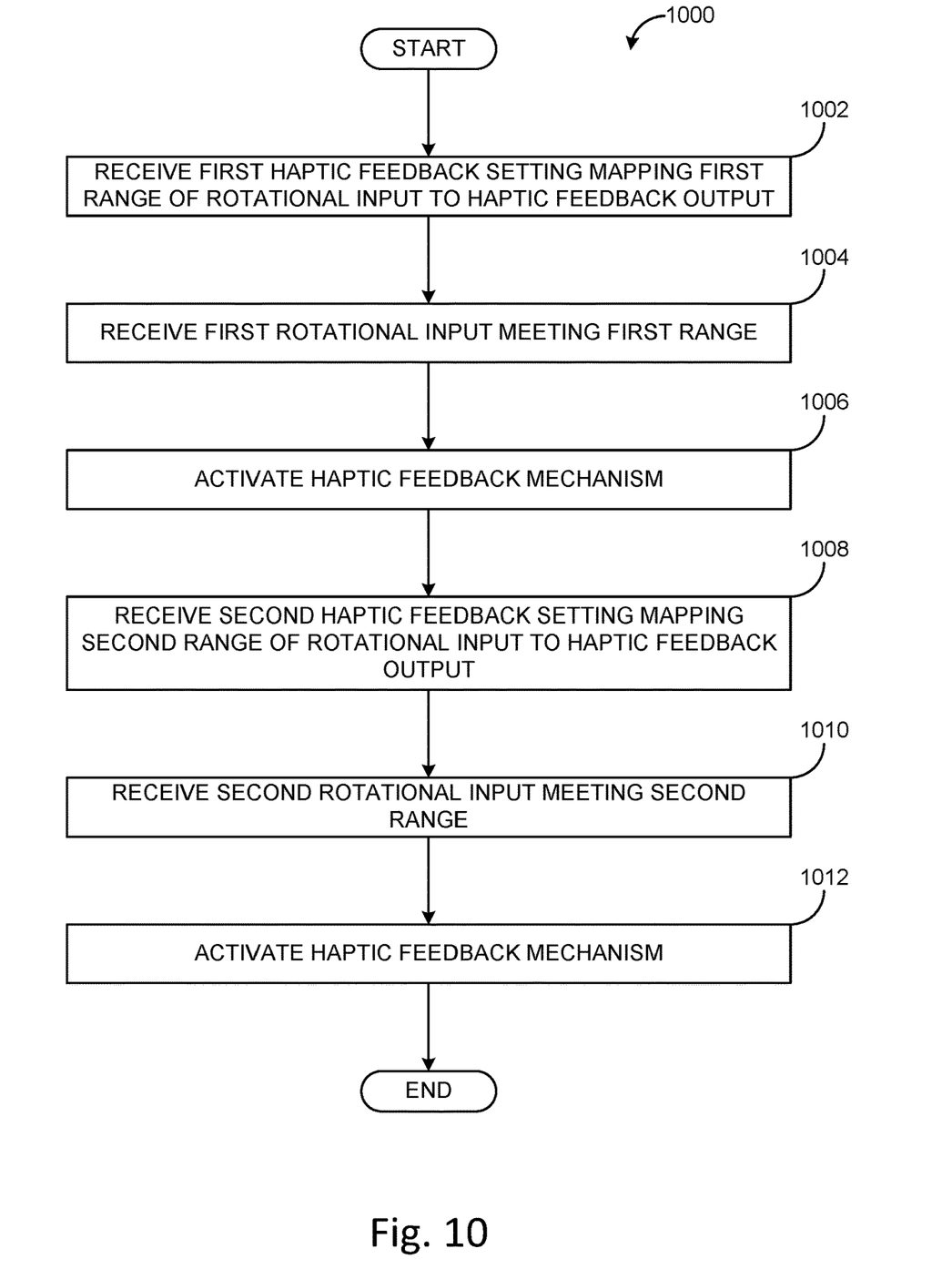
FIG. 10 shows a flowchart illustrating an example method of providing haptic feedback on a user input device having a rotational input mechanism and a haptic feedback mechanism.

FIG. 10 shows a flowchart illustrating an example method 1000 of providing haptic feedback on a user input device having a rotational input mechanism and a haptic feedback mechanism. Method 1000 may be used to provide haptic feedback on user input device 100 of FIG. 1, for example.

At 1002, method 1000 comprises receiving a first haptic setting that maps a first range of rotational input of the rotational input mechanism to a haptic feedback output. Next, at 1004, method 1000 comprises receiving a first rotational input that meets the first range of rotational input, and at 1006 activating the rotational feedback mechanism in response to receiving the first rotational input.

At 1008 of method 1000, a second haptic setting is received that maps a second range of rotational input of the rotational input mechanism to the haptic feedback output. The second range of rotational input may be different from the first range of rotational input.

At 1010, method 1000 comprises receiving at the input device a second rotational input that meets the second range of rotational input, and at 1012 of method 1000, activating the haptic feedback mechanism in response to receiving the second rotational input.

In some implementations, the methods and processes described herein may be tied to a computing system of one or more computing devices. In particular, such methods and processes may be implemented as a computer-application program or service, an application-programming interface (API), a library, and/or other computer-program product.

Figure 11:
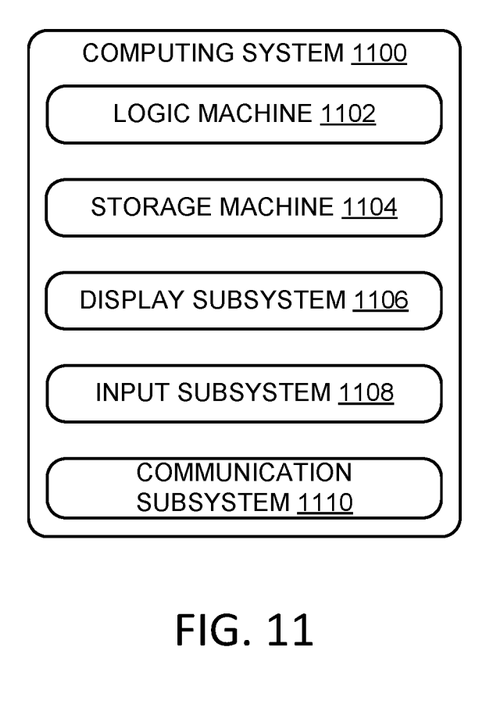
FIG. 11 shows a block diagram of an example computing device.

FIG. 11 schematically shows an example computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

Storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1100 implemented to perform a particular function. In some cases, a program may be instantiated via logic machine 1102 executing instructions held by storage machine 1104. Different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

A "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 1100 to send and/or receive messages to and/or from other devices via a network such as the Internet.

Another example provides a method comprising receiving user inputs from a user input device, monitoring a touch-sensitive display device for detection of a presence of the user input device via the touch-sensitive display device, when the user input device is detected by the touch-sensitive display device, utilizing a first user input mode in which a first user interface is displayed on the touch-sensitive display device at a location based upon a location of the input device on the touch-sensitive display device, and when the user input device is not detected by the touch-sensitive display device, utilizing a second user input mode in which a second user interface is displayed at a location on the touch-sensitive display device not based upon a location of the input device. In such an example, the method alternatively or additionally may comprise, while utilizing the first input mode, tracking motion of the user input device, and moving the first user interface in response to the tracked motion of the user input device. In such an example, the first user interface alternatively or additionally may include one or more selectable user interface elements at least partially distributed about the location of the input device on the touch-sensitive display device. In such an example, the method alternatively or additionally may comprise receiving rotational input from the user input device, and in response to receiving the rotational input, changing a selection of the one or more selectable user interface elements. In such an example, detecting the presence of the user input device alternatively or additionally may include detecting a conductive pattern on the user input device. In such an example, the method alternatively or additionally may comprise sending a haptic feedback setting to the user input device, the haptic feedback setting instructing the user input device to output haptic feedback in response to a rotational input supplied via the user input device meeting a range of rotational input specified by the haptic feedback setting. In such an example, the method alternatively or additionally may comprise responsive to receiving an indication from the user input device that a stylus has docked in a recess of the user input device, altering at least one function of a displayed user interface. Any or all of the above-described examples may be combined in any suitable manner in various implementations.

Another example provides, on a user input device having a rotational input mechanism and a haptic feedback mechanism, a method of providing haptick feedback, comprising receiving a first haptic feedback setting mapping a first range of rotational input of the rotational input mechanism to a haptic feedback output, receiving a first rotational input that meets the first range of rotational input at the input device, and in response activating the haptic feedback mechanism, receiving a second haptic feedback setting mapping a second range of rotational input of the rotational input mechanism device to the haptic feedback output, the second range being different than the first range, and receiving a second rotational input that meets the second range of rotational input of the input device, and in response activating the haptic feedback mechanism. In such an example, the haptic feedback mechanism alternatively or additionally may be coupled to the rotational input mechanism. In such an example, the first and second haptic feedback settings alternatively or additionally may be determined based on respective positions of one or more user interface elements in a user interface. Any or all of the above-described examples may be combined in any suitable manner in various implementations.

Another example provides an input device comprising a control configured for rotation about an axis and for depression along the axis, a rotational encoder configured to sense rotation of the control, a base comprising a conductive pattern, and a communications subsystem configured to transmit information regarding rotation and depression of the control to a touch-sensitive display device. In such an example, the rotational encoder alternatively or additionally may be configured to sense one or more of a speed and a direction of a rotational displacement of the control. In such an example, the rotational encoder alternatively or additionally may comprise an optical encoder. In such an example, the conductive pattern alternatively or additionally may comprise a bullseye pattern. In such an example, the input device alternatively or additionally may comprise a door openable to access a power source of the input device, the door biased toward a closed position via a spring-biased hinge and held in the closed position via one or more magnets. In such an example, the communication subsystem alternatively or additionally may be configured to transmit information regarding one or more of a rotational displacement of the control sensed by the rotational encoder, a communication pairing signal, and a battery life indication of a battery in the input device. In such an example, the input device alternatively or additionally may comprise a light source configured to output a low battery life indication. In such an example, the input device alternatively or additionally may comprise a first material on a first portion of a surface of the base and a second material on a second portion of the surface of the base, the first material configured for sliding movement across the touch-sensitive display device, the second material configured to oppose the sliding movement across the touch-sensitive display device. In such an example, the input device alternatively or additionally may comprise a recess including a sensor configured to sense docking of a stylus in the recess, the communications subsystem further configured to transmit an indication of the docking of the stylus. In such an example, the input device alternatively or additionally may comprise a recess configured to receive and charge the stylus. Any or all of the above-described examples may be combined in any suitable manner in various implementations.

The configurations and/or approaches described herein are example in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method comprising:
receiving user inputs from a user input device;
monitoring a touch-sensitive display device for detection of a presence of the user input device via the touch-sensitive display device;
when a presence of the user input device is detected by the touch-sensitive display device via sensing of a capacitive pattern on a base of the user input device, and is connected via a wireless connection to the touch-sensitive display device, utilizing a first user input mode in which a first user interface for receiving inputs from the user input device is displayed on the touch-sensitive display device, the first user interface comprising user interface elements displayed at locations adjacent to a location of the input device,
tracking movement of the user input device, and
moving the first user interface in response to tracking the movement of the user input device; and
when the presence of the user input device is not detected by the touch-sensitive display device as determined by not sensing the capacitive pattern and is connected via the wireless connection to the touch-sensitive display device, utilizing a second user input mode in which a second user interface for receiving inputs from the user input device is displayed on the touch-sensitive display device, wherein the user interface elements are displayed at predetermined locations on the touch-sensitive display device.

2. The method of claim 1, wherein the presence of the user input is detected by detecting the user input device hovering over the touch-sensitive display device.

3. The method of claim 1, wherein the first user interface comprises user interface elements arranged around a perimeter of the user input device.

4. The method of claim 1, wherein the user interface elements include one or more selectable user interface elements, the method further comprising
receiving rotational input from the user input device; and
in response to receiving the rotational input, moving a highlighting from a first a selectable user interface element to a second selectable user interface element.

5. The method of claim 4, further comprising receiving an input to interact with the second selectable user interface element, and in response activating a functionality of the second selectable user interface element.

6. The method of claim 1, wherein monitoring the touch-sensitive display device for detection of the presence of the user input device comprises monitoring via one or more of capacitive, resistive, and optical touch sensing mechanisms.

7. The method of claim 1, further comprising
receiving, from the user input device, a rotational input that is mapped to a system function of the computing device; and
controlling the system function based on the rotational input received.

8. On a user input device having a rotational input mechanism and a haptic feedback mechanism, a method of providing haptic feedback, comprising:
receiving a first haptic feedback setting mapping a first range of rotational input of the rotational input mechanism to a haptic feedback output, the first range comprising a first angular distance;
receiving a first rotational input that meets the first range of rotational input at the input device, and in response activating the haptic feedback mechanism;
receiving a second haptic feedback setting mapping a second range of rotational input of the rotational input mechanism device to the haptic feedback output, the second range comprising a second angular distance different than the first angular distance; and
receiving a second rotational input that meets the second range of rotational input of the input device, and in response activating the haptic feedback mechanism,
wherein the first and second haptic feedback settings are determined based on respective positions of one or more user interface elements in a user interface of a computing device receiving input from the user input device.

9. The method of claim 8, wherein the first range of rotational input corresponds to a spacing between user interface elements in a first user interface context and the second range of rotational input corresponds to a spacing between the user interface elements in a second user interface context.

10. The method of claim 8, wherein the first range of rotation input comprises two or more intervals, further comprising activating the haptic feedback mechanism in response to receiving a rotational input that meets an interval within the first range of rotational input.

11. An input device comprising:
a control configured for rotation about an axis and for depression along the axis;
a rotational encoder configured to sense rotation of the control;
a base comprising a conductive pattern, wherein the control is rotatable and depressible relative to the base;
a haptic feedback mechanism configured to output haptic feedback; and
a communications subsystem configured to transmit information regarding rotation and depression of the control to a display device and configured to receive a haptic feedback setting from the display device for controlling the haptic feedback, wherein the haptic feedback setting includes an instruction for the haptic feedback mechanism to output haptic feedback in response to rotation of the control about the axis meeting a range of rotational input determined based on respective positions of one or more user interface elements in a user interface of the display device.

12. The input device of claim 11, wherein the rotational encoder is further configured to sense an angular orientation of the control.

13. The input device of claim 11, wherein the rotational encoder is further configured to sense a speed of a rotational displacement of the control.

14. The input device of claim 11, wherein the conductive pattern is configured to be detectable by the display device when the input device is held hovering over the display device.

15. The input device of claim 11, wherein a power source of the input device is configured to provide a time-varying voltage to the conductive pattern.

16. The input device of claim 15, wherein the time-varying voltage is modulated to encode output from one or more of the rotational encoder, the control, and/or a state of the power source.

17. The input device of claim 11, further comprising a light source configured to output light indicating a status of a pairing process between the user input device and the display device.

18. The input device of claim 11, wherein the conductive pattern is at least partially asymmetric.

19. The input device of claim 11, wherein the conductive pattern is coupled to the control such that a capacitance of the conductive pattern varies in response to a user touch input to the control.

20. The input device of claim 11, further comprising a recess configured to receive a stylus, the recess comprising a sensor configured to detect a docking of the stylus within the recess and to transmit information regarding the stylus to the display device.

* * * * *